(12) United States Patent
Ding et al.

(10) Patent No.: US 11,334,194 B2
(45) Date of Patent: May 17, 2022

(54) LIGHT DETECTION CIRCUIT, ELECTRONIC DEVICE, AND OPTICAL RECOGNITION METHOD

(71) Applicant: BOE Technology Group Co., Ltd., Beijing (CN)

(72) Inventors: Xiaoliang Ding, Beijing (CN); Xue Dong, Beijing (CN); Haisheng Wang, Beijing (CN); Yingming Liu, Beijing (CN); Wei Liu, Beijing (CN); Bo Chen, Beijing (CN); Xueyou Cao, Beijing (CN); Pengpeng Wang, Beijing (CN); Ping Zhang, Beijing (CN); Likai Deng, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 243 days.

(21) Appl. No.: 16/647,909

(22) PCT Filed: Jul. 25, 2019

(86) PCT No.: PCT/CN2019/097782
§ 371 (c)(1),
(2) Date: Mar. 17, 2020

(87) PCT Pub. No.: WO2020/020310
PCT Pub. Date: Jan. 30, 2020

(65) Prior Publication Data
US 2020/0225806 A1 Jul. 16, 2020

(30) Foreign Application Priority Data
Jul. 26, 2018 (CN) .......................... 201810838077.4

(51) Int. Cl.
*G06F 3/00* (2006.01)
*G06K 9/00* (2022.01)
(Continued)

(52) U.S. Cl.
CPC .......... *G06F 3/0421* (2013.01); *G06F 3/0416* (2013.01); *G06K 9/0004* (2013.01); *G06K 9/0008* (2013.01)

(58) Field of Classification Search
CPC ... G06F 3/0421; G06F 3/0416; G06K 9/0004; G06K 9/0008; G01D 5/26; G01J 1/44; G01J 2001/446
See application file for complete search history.

(56) References Cited

U.S. PATENT DOCUMENTS

| 7,741,593 B2 * | 6/2010 | Iwata | H04N 5/378 |
| | | | 250/214 R |
| 9,332,203 B2 * | 5/2016 | Kinugasa | H04N 5/378 |
| | | (Continued) | |

FOREIGN PATENT DOCUMENTS

| CN | 1989510 A | 6/2007 |
| CN | 101644587 A | 2/2010 |
| | (Continued) | |

OTHER PUBLICATIONS

International search report of PCT application No. PCT/CN2019/097782 dated Oct. 30, 2019.
(Continued)

*Primary Examiner* — Seung C Sohn
(74) *Attorney, Agent, or Firm* — Fay Sharpe LLP

(57) ABSTRACT

A light detection circuit, an electronic device, and an optical recognition method are provided. The light detection circuit includes a charge storage sub-circuit (10), a photoelectric conversion sub-circuit (30), a signal collection sub-circuit (40), and a potential pull-up sub-circuit (50). When a potential of a reading node (A) is decreased by a preset value, the potential pull-up sub-circuit (50) changes the potential of the reading node (A) to an initial potential. A photoelectric diode may continuously generate a light current under the action of light, so that the potential of the reading node (A) is decreased again. Even when the intensity of ambient light is high, a touch can be accurately recognized in an optical touch recognition circuit, and ridge lines and valley lines can
(Continued)

be accurately recognized in an optical fingerprint recognition circuit.

20 Claims, 14 Drawing Sheets

(51) Int. Cl.
*G06F 3/042* (2006.01)
*G06F 3/041* (2006.01)

(56) References Cited

U.S. PATENT DOCUMENTS

| 2002/0066848 A1 | 6/2002 | Fowler |
| 2006/0016893 A1 | 1/2006 | Barkan et al. |
| 2006/0208291 A1 | 9/2006 | Koizumi et al. |
| 2010/0207889 A1 | 8/2010 | Chen et al. |
| 2015/0009386 A1 | 1/2015 | Komaba |
| 2016/0266695 A1 | 9/2016 | Bae et al. |
| 2018/0098005 A1 | 4/2018 | Hanzawa |

FOREIGN PATENT DOCUMENTS

| CN | 108062540 A | 5/2018 |
| CN | 108280432 A | 7/2018 |
| EP | 1883251 A1 | 1/2008 |
| WO | 2015008902 A1 | 1/2015 |

OTHER PUBLICATIONS

Extended European search report of counterpart EP application No. 19841199.3 dated Mar. 24, 2022.

\* cited by examiner

LIGHT DETECTION CIRCUIT, ELECTRONIC DEVICE, AND OPTICAL RECOGNITION METHOD

The present disclosure is a 371 of PCT/CN2019/097782 filed Jul. 25, 2019, which claims priority to Chinese Patent Application No. 201810838077.4, filed on Jul. 26, 2018 and entitled "LIGHT DETECTING CIRCUIT AND ELECTRONIC DEVICE, DRIVE METHOD, AND OPTICAL RECOGNITION METHOD AND APPARATUS", the entire contents of which are incorporated herein by reference.

TECHNICAL FIELD

The present disclosure relates to the field of electronic device technology, and in particular to a light detection circuit, an electronic device, and an optical recognition method.

BACKGROUND

Optical touch technology and optical fingerprint recognition technology, both of which are based on light detection circuits, have been widely applied in electronic products. Typically, the light detection circuits recognize touch regions and non-touch regions, or ridge lines and valley lines of a fingerprint, based on the detected intensity of light reflected by a finger.

SUMMARY

The present disclosure provides a light detection circuit, an electronic device, a drive method, and an optical recognition method and apparatus.

In one aspect, the present disclosure provides a light detection circuit. The circuit includes:

a charge storage sub-circuit, which is connected between a reading node and a first power terminal;

a photoelectric conversion sub-circuit, which has one end connected to the reading node, and the other end connected to the first power terminal;

a signal collection sub-circuit, which is connected to a scanning signal input terminal and the reading node respectively, and is configured to acquire and output an electrical signal of the reading node under the control of a scanning signal received by the scanning signal input terminal; and a potential pull-up sub-circuit, which is connected to the reading node and a second power terminal respectively, and is configured to connect the charge storage sub-circuit with the second power terminal when a potential of the reading node is decreased by a preset value, thereby pulling up the potential of the reading node to an initial potential.

Optionally, the potential pull-up sub-circuit includes a diode, a first electrode of the diode is connected to the reading node, and a second electrode of the diode is connected to the second power terminal.

Optionally, the first power terminal is configured to provide a first power signal, the second power terminal is configured to provide a second power signal, and a potential of the first power signal is lower than a potential of the second power signal; and the first electrode of the diode is a cathode, and the second electrode of the diode is an anode.

Optionally, the signal collection sub-circuit includes a first thin film transistor, a first electrode of the first thin film transistor is connected to the reading node, a control electrode of the first thin film transistor is connected to the scanning signal input terminal, and a second electrode of the first thin film transistor is configured to output the electrical signal of the reading node.

Optionally, the signal collection sub-circuit includes an amplification sub-circuit and a signal output sub-circuit, the amplification sub-circuit is connected to the reading node and the second power terminal, and is configured to amplify the electrical signal of the reading node and output the amplified electrical signal to the signal output sub-circuit; and the signal output sub-circuit is connected to the amplification sub-circuit and the scanning signal input terminal, respectively, and is configured to output the received amplified electrical signal under the control of the scanning signal received by the scanning signal input terminal.

Optionally, the amplification sub-circuit includes a voltage follower, a power terminal of the voltage follower is connected to the second power terminal, an input terminal of the voltage follower is connected to the reading node, and an output terminal of the voltage follower is connected to an input terminal of the signal output sub-circuit.

Optionally, the voltage follower includes a second thin film transistor, a first electrode of the second thin film transistor is connected to the second power terminal, a control electrode of the second thin film transistor is connected to the reading node, a second electrode of the second thin film transistor is connected to the input terminal of the signal output sub-circuit, and the bias constant current source, which is connected between an output terminal of the signal output sub-circuit and the first power terminal.

Optionally, the signal output sub-circuit includes a first thin film transistor, a first electrode of the first thin film transistor is connected to the second electrode of the second thin film, a control electrode of the first thin film transistor is connected to the scanning signal input terminal, a second electrode of the first thin film transistor is configured to output the amplified electrical signal, and the amplification sub-circuit further includes a bias constant current source, which is connected between an output terminal of the signal output sub-circuit and the first power terminal.

Optionally, the amplification sub-circuit includes a voltage-controlled current source, a power terminal of the voltage-controlled current source is connected to the second power terminal, a control terminal of the voltage-controlled current source is connected to the reading node, and an output terminal of the voltage-controlled current source is connected to an input terminal of the signal output sub-circuit.

Optionally, the voltage-controlled current source includes a third thin film transistor, a first electrode of the third thin film transistor is connected to the second power terminal, a control electrode of the third thin film transistor is connected to the reading node, and a second electrode of the third thin film transistor is connected to the input terminal of the signal output sub-circuit.

Optionally, the signal output sub-circuit includes a first thin film transistor, a first electrode of the first thin film transistor is connected to the second electrode of the third thin film transistor is connected, a control electrode of the first thin film transistor is connected to the scanning signal input terminal, and a second electrode of the first thin film transistor (421) is configured to output the amplified electrical signal.

Exemplarily, the photoelectric conversion sub-circuit includes a photoelectric diode, a first electrode of the photoelectric diode is connected to the reading node, and a second electrode of the photoelectric diode is connected to the first power terminal.

Exemplarily, the charge storage sub-circuit includes a capacitor, and two polar plates of the capacitor are connected to the reading node and the first power terminal, respectively.

Optionally, the light detection circuit further includes: a resetting sub-circuit, which is connected to a resetting signal input terminal, the reading node and the second power terminal, respectively, and is configured to reset the potential of the reading node to the initial potential under the control of a resetting signal (Rst) received by the resetting signal input terminal.

Optionally, the resetting sub-circuit includes a fourth thin film transistor, a first electrode of the fourth thin film transistor is connected to the second power terminal, a control electrode of the fourth thin film transistor is connected to the resetting signal input terminal (Rst), and a second electrode of the fourth thin film transistor is connected to the reading node.

Optionally, the light detection circuit further includes a resetting sub-circuit, wherein the charge storage sub-circuit includes a capacitor, the photoelectric conversion sub-circuit includes a photoelectric diode, the resetting sub-circuit includes a fourth thin-film transistor, the signal collection sub-circuit includes a first thin-film transistor and a second thin-film transistor, and the potential pull-up circuit includes a diode, two polar plates of the capacitor are connected to the reading node and the first power terminal, respectively, a first electrode of the diode is connected to the reading node, and a second electrode of the diode is connected to the second power terminal, a first electrode of the photoelectric diode is connected to the reading node, and a second electrode of the photoelectric diode is connected to the first power terminal, and a first electrode of the fourth thin film transistor is connected to the second power terminal, and a second electrode of the fourth thin film transistor is connected to the reading node;

a first electrode of the second thin film transistor is connected to the second power terminal, a control electrode of the second thin film transistor is connected to the reading node, a second electrode of the second thin film transistor is connected to a first electrode of the first thin film transistor, a control electrode of the first thin film transistor is connected to the scanning signal input terminal, and the bias constant current source is connected between a second electrode of the first thin film transistor and the first power terminal.

In another aspect, the present disclosure also provides an electronic device. The electronic device includes the light detection circuit described above.

Optionally, the electronic device includes a substrate and a plurality of the light detection circuits distributed according to a matrix distribution on the substrate, wherein the substrate is provided with a plurality of scanning lines and a plurality of reading lines, the plurality of scanning lines are arranged in parallel at interval along a first direction, each of the scanning lines is connected to the scanning signal input terminals of the plurality of light detection circuits arranged along a second direction, the plurality of reading lines are arranged in parallel at interval along the second direction, and each of the reading lines is connected to output terminals of the signal collection sub-circuits of a plurality of the light detection circuits arranged along the first direction.

Optionally, the electronic device further includes a processing circuit, wherein the processing circuit is connected to the reading lines, and is configured to obtain quantities of charges discharged by the charge storage sub-circuits in the light detection circuits in a detection period according to the electrical signals, which are collected by the reading lines, of the reading nodes of the plurality of the light detection circuits.

Optionally, the processing circuit is further configured to distinguish between ridges and valleys in a fingerprint or to distinguish between touch regions and non-touch region, according to difference values between the quantities of charges and a reference quantity of charges.

Optionally, the reference quantity of charges is the minimum among the quantities of charges discharged by the charge storage sub-circuits in the plurality of the light detection circuits.

In yet another aspect, the present disclosure also provides a drive method for the light detection circuit. The method includes:

inputting a scanning signal to the signal collection sub-circuit, enabling the signal collection sub-circuit to acquire and output the electrical signals of the reading node, and pulling up, when the signal collection sub-circuit is acquiring the electrical signals of the reading node, the potential of the reading node to the initial potential when the potential of the reading node is decreased by the preset value.

In still yet another aspect, the present disclosure also provides an optical recognition method. The method is for the electronic device described above. The method includes:

obtaining the electrical signals of the reading nodes of the plurality of the light detection circuits;

determining quantities of charges discharged by the charge storage sub-circuits in the light detection circuits in the detection period according to the electrical signals of the reading nodes of the plurality of the light detection circuits; and recognizing the ridges and valleys in the fingerprint or distinguishing between the touch regions and the non-touch regions, according to the quantities of charges.

Optionally, the determining quantities of charges discharged by the charge storage sub-circuits in the light detection circuits in the detection period according to the electrical signals of the reading nodes of the plurality of the light detection circuits includes:

determining quantities of charges discharged by the charge storage sub-circuits in the light detection circuits in the detection period based on the preset value, the initial potential, a value to which the potential of the reading nodes is decreased finally in the detection period, and a number of times the potential of the reading node is reset to the initial potential in the detection period.

In still yet another aspect, the present disclosure also provides an optical recognition apparatus, and the optical recognition apparatus includes: a processor; and a memory configured to store processor-executable instructions, wherein the processor is configured to perform the optical recognition method described above.

In still yet another aspect, the present disclosure also provides a computer-readable storage medium, wherein when instructions in the computer-readable storage medium are executed by a processor of a server, the server is capable of executing the optical recognition method described above.

DETAILED DESCRIPTION

The present disclosure will be described in further detail with reference to the accompanying drawings, to present the objects, technical solutions, and advantages of the present disclosure more clearly.

In related arts, a light detection circuit for touch recognition and fingerprint recognition includes a photoelectric diode and a charge storage means. When light reflected by a finger irradiate the photoelectric diode, the photoelectric diode generates a light current under the action of a reverse voltage provided by the charge storage means. The greater the intensity of the light irradiating the photoelectric diode, the greater the generated light current is.

Due to the generation of the light current, the charge storage means discharges charges, so that the quantity of charges stored in the charge storage means is reduced, a potential at one end of the charge storage means is decreased, and a signal acquisition circuit performs touch recognition or fingerprint recognition based on the change in potential here.

When a touch region is under recognition, the light currents generated by the photoelectric diode in touch regions and non-touch regions are different in magnitude, leading to different quantities of charges discharged by the charge storage means, thereby touch regions and non-touch regions can be recognized. In the fingerprint recognition process, the light currents generated by the photoelectric diode in regions corresponding to ridge lines and valley lines are different, the quantities of charges discharged by the charge storage means are different, and thus, the ridge lines and valley lines of a fingerprint can be recognized.

Whether in a light detection circuit for touch recognition or in a light detection circuit for fingerprint recognition, the photoelectric diode would generate the light current since ambient light may also irradiate the photoelectric diodes. When the intensity of the ambient light is high, the photoelectric diode generates a large light current, leading to quick discharging of the charges stored in the charge storage means. In this case, the quantities of changes in the potential acquired by the signal acquisition circuits are equal in value. Therefore, the touch regions and non-touch regions or the ridge lines and valley lines of the fingerprint cannot be recognized.

Figure 1:
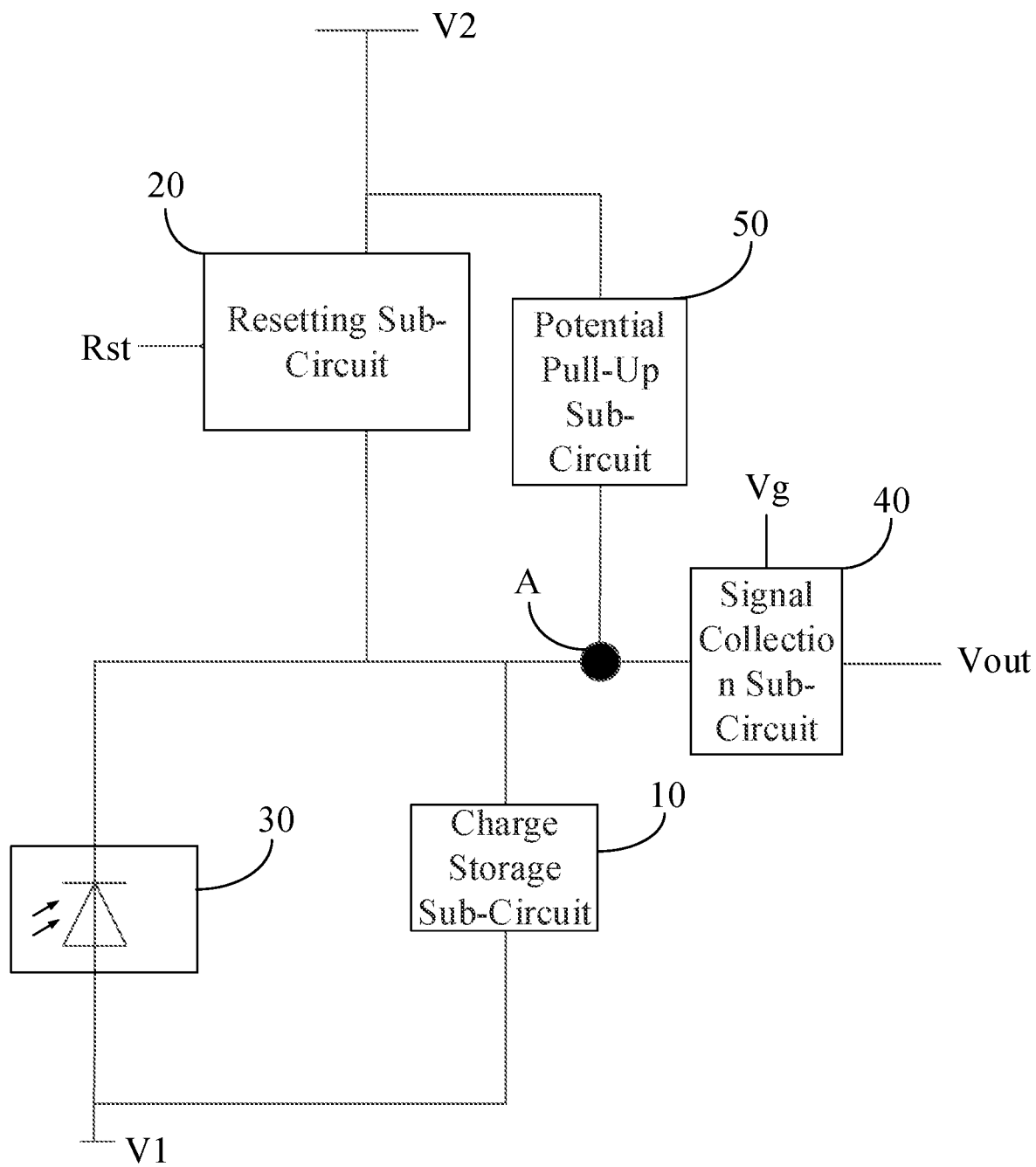
FIG. 1 is a schematic structural diagram of a light detection circuit according to an embodiment of the present disclosure.

FIG. 1 is a schematic structural diagram of a light detection circuit according to an embodiment of the present disclosure. As shown in FIG. 1, the light detection circuit includes a charge storage sub-circuit 10, a photoelectric conversion sub-circuit 30, a signal collection sub-circuit 40, and a potential pull-up sub-circuit 50.

The charge storage sub-circuit 10 is connected between a reading node A and a first power terminal V1. That is, the charge storage sub-circuit 10 has one end connected to the reading node A, and the other end connected to the first power terminal V1.

The photoelectric conversion sub-circuit 30 has one end connected to the reading node A, and the other end connected to the first power terminal V1. That is, two ends of the photoelectric conversion sub-circuit 30 are connected to two ends of the charge storage sub-circuit 10 in parallel.

The signal collection sub-circuit 40 is connected to a scanning signal input terminal Vg and the reading node A, respectively, and is configured to acquire an electrical signal of the reading node A under the control of a scanning signal received by the scanning signal input terminal Vg.

The potential pull-up sub-circuit 50 is connected to the reading node A and a second power terminal V2, respectively, and is configured to connect the charge storage sub-circuit 10 with the second power terminal V2 when a potential of the reading node A is decreased by a preset value, thereby pulling up the potential of the reading node A to an initial potential.

The initial potential is a potential before the potential of the reading node A is decreased. The magnitude of the initial potential may be positively related to a potential difference between the first power terminal V1 and the second power terminal V2, for example, being equal to the potential difference between the first power terminal V1 and the second power terminal V2. As an example, in the embodiment, the initial potential is the potential of the second power terminal V2. The preset value is less than the potential difference between the two ends of the charge storage sub-circuit 10 before the potential of the reading node A is decreased, so as to limit the decrease degree of the potential of the reading node A. By setting the preset value, the potential of the reading node A may not be decreased to the same value as that of the first power terminal V1, so that a photoelectric diode may continuously generate the light current under the action of light, without reaching a saturation state and then stopping generating, light current in the detecting process of the light detection circuit.

The potential pull-up sub-circuit connects the charge storage sub-circuit with the second power terminal, the charge storage sub-circuit is charged, and the potential of the reading node is changed to the initial potential, when the potential of the reading node is decreased by the preset value in the detecting process of the light detection circuit. The photoelectric diode may continuously generate a light current under the action of light, so that the potential of the reading node may be decreased again. The signal collection sub-circuit may continuously acquire the electrical signals of the reading node, and the electrical signals may be used to reflect the potential of the reading node, thereby obtaining the total potential changes of the reading node. Accordingly, even when the intensity of ambient light is high, a touch can be accurately recognized in an optical touch recognition circuit, and ridge lines and valley lines can be accurately recognized in an optical fingerprint recognition circuit.

Alternatively, the light detection circuit may further include a resetting sub-circuit 20. The resetting sub-circuit 20 is connected between the reading node A and the second power terminal V2, and is configured to reset the potential of the reading node A to the initial potential under the control of a resetting signal Rst received by the resetting signal input terminal.

A control terminal of the resetting sub-circuit 20 is connected to a resetting signal line which is connected to a resetting signal input end; a first terminal of the resetting sub-circuit 20 is connected to the reading node A; and a second terminal of the resetting sub-circuit 20 is connected to the second power terminal V2. Before each time the signal collection sub-circuit starts to acquire the electrical signals of the reading node under the control of the scanning signal, the resetting sub-circuit 20 may reset the potential of the reading node A to the initial potential under the control of the resetting signal Rst. In the detecting process, the potential of the reading node A may be decreased from the initial potential each time, thereby facilitating the obtaining of the total potential changes of the reading node A in the detecting process.

Alternatively, the potential pull-up sub-circuit 50 may include a diode, which has a first electrode connected to the reading node A, and a second electrode connected to the second power terminal V2. The preset value is a threshold voltage of the diode, and may be changed by selecting a diode with a different threshold voltage. In the detecting process, the decrease in the potential of the reading node A is the decrease in the potential of the first electrode of the diode. When the potential difference between the potential of the reading node A and the second power terminal V2 reaches the threshold voltage of the diode, the diode is turned on to connect the charge storage sub-circuit 10 with the second power terminal V2, and a potential at a connection between the charge storage sub-circuit 10 and the second power terminal V2 is increased, thereby changing the potential of the reading node A to the initial potential again, so that the potential of the reading node A may not be decreased to the same potential as that of the first power terminal V1. The diode is turned off again after the potential is pulled up, and the potential of the reading node A starts to change from the initial potential again. With the diode used for automatically pulling up the potential of the reading node A, the structure is simple and easy to implement.

Alternatively, the threshold voltage of the diode may be 0.5-1.0 V.

Figure 2:
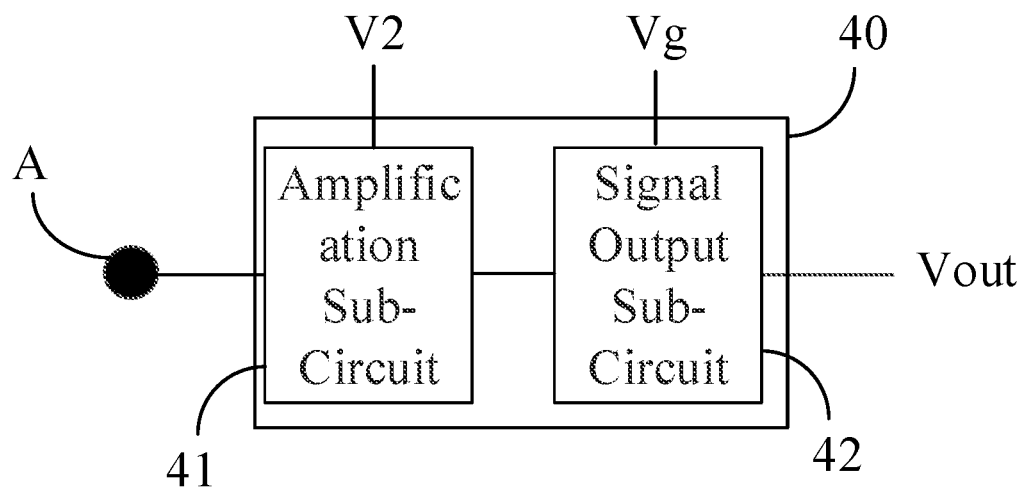
FIG. 2 is a partially schematic structural diagram of a light detection circuit according to an embodiment of the present disclosure.

FIG. 2 is a partially schematic structural diagram of a light detection circuit according to an embodiment of the present disclosure. As shown in FIG. 2, the signal collection sub-circuit 40 may include an amplification sub-circuit 41 and a signal output sub-circuit 42. The amplification sub-circuit 41 is connected to the reading node A and the second power terminal V2, and the signal output sub-circuit 42 is connected to the amplification sub-circuit 41 and the scanning signal input terminal Vg, respectively. The amplification sub-circuit 41 is configured to amplify the electrical signal of the reading node A and output the amplified electrical signal to the signal output sub-circuit 42. The signal output sub-circuit 42 is configured to output the received electrical signal under the control of the scanning signal received by the scanning signal input terminal Vg. In the detecting process, the potential change at the reading node A is small, the electrical signal directly obtained is weak, and thus, the amplification sub-circuit 41 is provided to amplify the electrical signal at the reading node A so as to facilitate the Obtaining of signals.

Alternatively, the amplification sub-circuit 41 may include a voltage follower, or may include a voltage-controlled current source.

Figure 3:
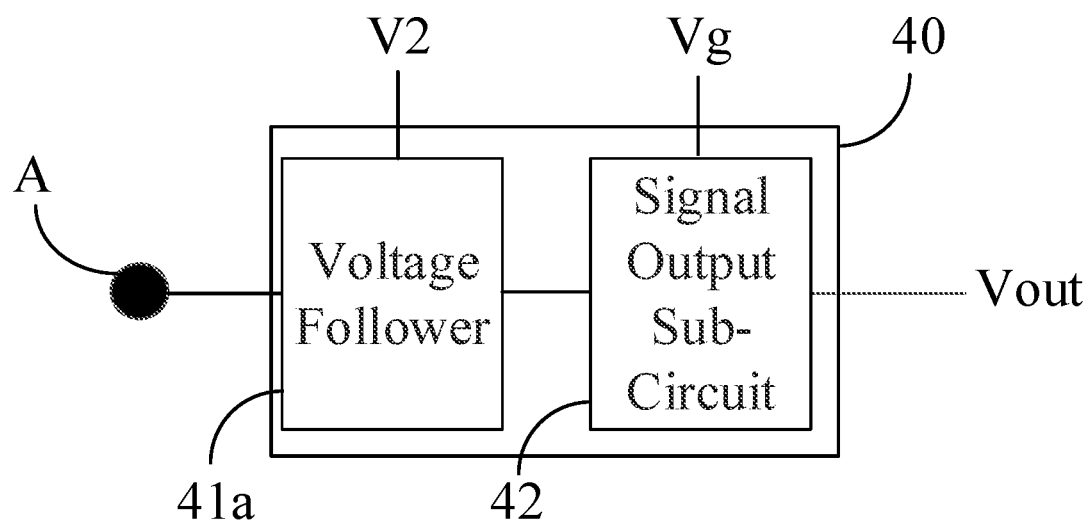
FIG. 3 is a partially schematic structural diagram of a light detection circuit according to an embodiment of the present disclosure.

FIG. 3 is a partially schematic structural diagram of a light detection circuit according to an embodiment of the present disclosure. As shown in FIG. 3, the amplification sub-circuit 41 includes a voltage follower 41a. A power terminal of the voltage follower 41a is connected to the second power terminal V2, an input terminal of the voltage follower 41a is connected to the reading node A, and an output terminal of the voltage follower 41a is connected to an input terminal of the signal output sub-circuit 42. An output voltage of the voltage follower 41a is in direct proportion to an input voltage the voltage follower 41a. The voltage of the reading node A is amplified by the voltage follower 41a, thereby facilitating the obtaining of the electrical signal of the reading node A.

Figure 4:
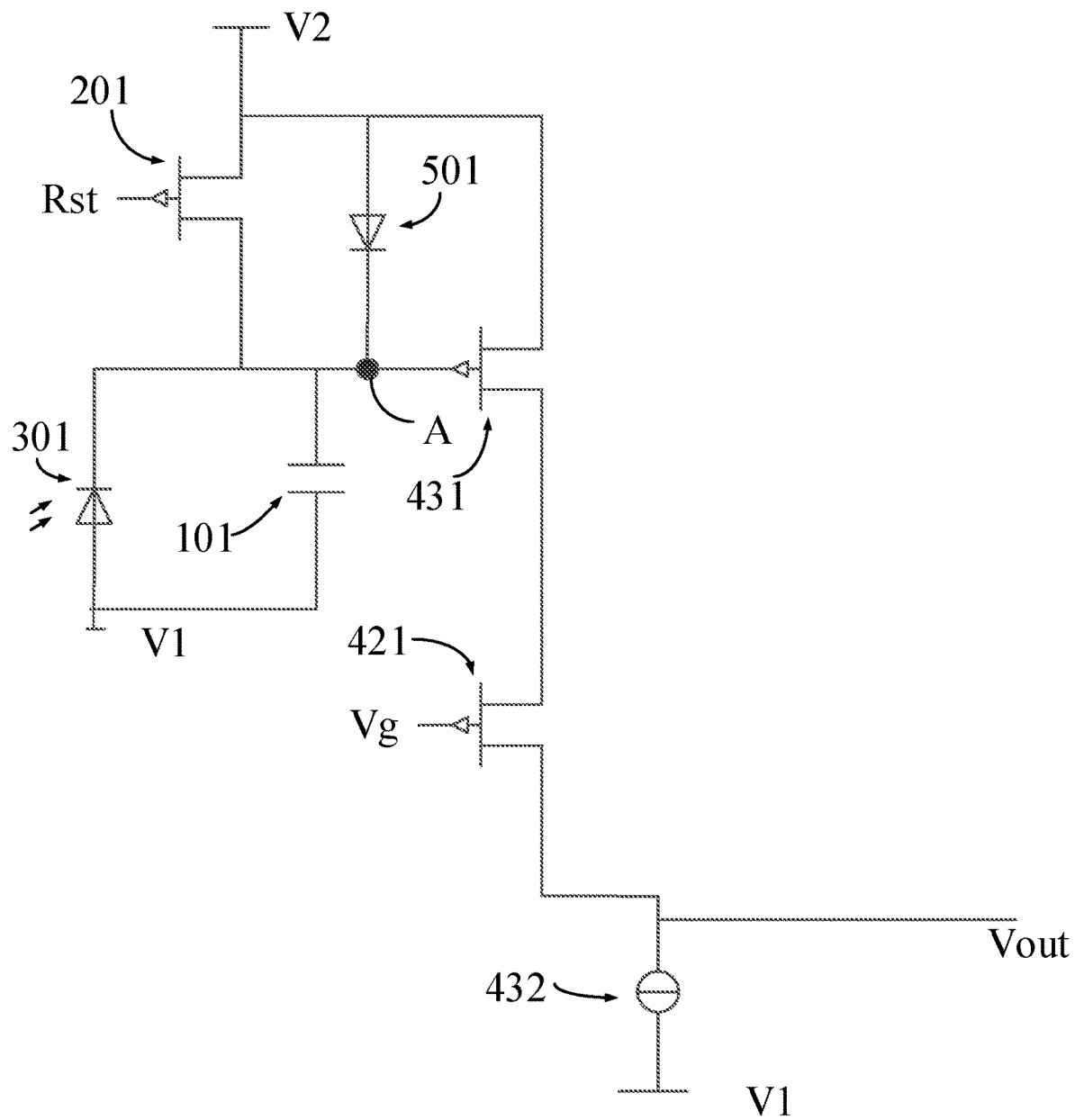
FIG. 4 is a circuit diagram of a light detection circuit according to an embodiment of the present disclosure.

As an example, a light detection circuit is provided for an illustrative purpose by taking the first power terminal V1 as a low-potential terminal and the second power terminal V2 as a high-potential terminal, by way of example. The light detection circuit is as shown in FIG. 4. In this light detection circuit, the first power terminal V1 is a low-potential terminal, and is configured to provide a first power signal; the second power terminal V2 is a high-potential terminal, and is configured to provide a second power signal; and a potential of the first power signal is lower than the potential of the second power signal.

As shown in FIG. 4, the potential puss-up sub-circuit may include a diode 501. A first electrode of the diode 501 is connected to the reading node A, and a second electrode of the diode 501 is connected to the second power terminal V2. For example, the first electrode of the diode 501 is a cathode, and the second electrode of the diode 501 is an anode.

In the detecting process, the decrease in the potential of the reading node A is the decrease in the potential of the cathode of the diode 501. When a potential difference between the reading node A and the second power terminal V2 reaches the threshold voltage of the diode 501, the diode 501 is turned on to pull up the potential of the reading node A to the initial potential (i.e., the potential of the second power signal), and the diode 501 is turned off again after the pulling-up. Due to the existence of the diode 501, the potential of the reading node A may not be decreased to the same potential as that of the first power signal. With the diode 501 for implementing the automatic pull-up of the potential of the reading node A, a structure is simple and easy to implement.

The photoelectric conversion sub-circuit may include a photoelectric diode 301, a first electrode of the photoelectric diode 301 is connected to the reading node A, and a second electrode of the photoelectric diode 301 is connected to the first power terminal V1. As an example, the first electrode of the photoelectric diode 301 is a cathode, and the second electrode of the photoelectric diode 301 is an anode.

The charge storage sub-circuit may include a capacitor 101; and two polar plates of the capacitor 101 are connected to the reading node A and the first power terminal V1, respectively. The capacitor 101 is charged in the resetting process and when the diode 501 is turned on. When the photoelectric diode 301 generates the light current, the capacitor 101 is discharged.

The resetting sub-circuit may include a fourth TFT (Thin Film Transistor) 201. A first electrode of the fourth TFT 201 is connected to the second power terminal V2, and a second electrode of the fourth TFT 201 is connected to the reading node A. A control electrode of the fourth TFT 201 is connected to the resetting signal input terminal, and is configured to input a resetting signal Rst. For example, the first electrode of the fourth TFT 201 may be a source electrode; the second electrode of the fourth TFT 201 may be a drain electrode; and the control electrode of the fourth TFT 201 may be a gate electrode. The fourth TFT 201 may be turned on under the control of the resetting signal Rst. When the fourth TFT 201 is turned on, the potential of the reading node A is reset to the initial potential. As an example, the initial potential may be equal to the potential of the second power terminal V2. That is, the potential of the reading node A after reset is equal to the potential of the second power terminals V2.

In the light detection circuit shown in FIG. 4, the voltage follower includes a second TFT 431. A first electrode of the second TFT 431 is connected to the second power terminal V2; a control electrode of the second TFT 431 is connected to the reading node A; and the second electrode of the second TFT 431 is connected to the signal output sub-circuit. The signal output sub-circuit may include a first TFT 421, a first electrode of which may be connected to the second electrode of the second TFT 431. A control electrode of the first TFT 421 is connected to the scanning signal input terminal Vg, which is configured to receive the scanning signal; and a bias constant current source 432 is connected between a second electrode of the first TFT 421 and the first power terminal V1. That is, the amplification sub-circuit further includes the bias constant current source 432 connected between the second electrode of the first TFT 421 and the first power terminal V1. The bias constant current source 432 is configured to allow the second TFT 431 to work in a saturation region, and the second TFT 431 to amplify the electrical signal of the reading node A without distortion.

For example, the first electrode of the first TFT 421 is a source electrode; the control electrode of the first TFT 421 is a gate electrode; and the second electrode of the first TFT 421 is a drain electrode. A first electrode of the second TFT 431 is a source electrode, a control electrode of the second TFT 431 is a gate electrode, and a second electrode of the second TFT 431 is a drain electrode. The potential of the source electrode of the second TFT 431 is always the same as the potential of the second power terminal V2, and the potential of the drain electrode of the second TFT 431 is in direct proportion to the potential of the gate electrode (i.e., the potential of the reading node A), thereby achieving the effect of amplifying the potential of the reading node A. The first TFT 421 is turned on under the action of the scanning signal, and the electrical signal amplified by the second TFT 431 may be output through the first TFT 421. With the amplification sub-circuit implemented by means of the small-size TFT, the size of the light detection circuit can be reduced favorably, and the TFT is fast in response speed and easy to control.

In the light detection circuit shown in FIG. 4, the charge storage sub-circuit includes a capacitor 101; the resetting sub-circuit includes a fourth TFT 201; the photoelectric conversion sub-circuit includes a photoelectric diode 301; the signal collection sub-circuit includes a first TFT 421 and a second TFT 431; and the potential pull-up sub-circuit includes a diode 501. Two polar plates of the capacitor 101 are connected to the reading node A and the first power terminal V1, respectively. A first electrode of the diode 501 is connected to the reading node A, and a second electrode of the diode 501 is connected to the second power terminal V2. A first electrode of the fourth TFT 201 is connected to the second power terminal V2, and a second electrode of the fourth TFT 201 is connected to the reading node A. A first electrode of the photoelectric diode 301 is connected to the reading node A, and a second electrode of the photoelectric diode 301 is connected to the first power terminal V1. A first electrode of the second TFT 431 is connected to the second power terminal V2; a control electrode of the second TFT 431 is connected to the reading node A; a second electrode of the second TFT 431 is connected to a first electrode of the first TFT 421; a control electrode of the first TFT 421 is connected to the scanning signal input terminal Vg, which is configured to receive the scanning signal; and the bias constant current source 432 is connected between a second electrode of the first TFT 421 and the first power terminal V1.

In the embodiment, the first power terminal V1 is a low-potential terminal; the second power terminal V2 is a high-potential terminal; and the fourth TFT 201, the first TFT 421, and the second TFT 431 are all N-type TFTs. In other embodiments, the first power terminal V1 is a high-potential terminal; the second power terminal V2 is a low-potential terminal; the fourth TFT 201, the first TFT 421, and the second TFT 431 may be configured as P-type TFTs; the diode 501 has a first electrode as an anode and a second electrode as a cathode; and the photoelectric diode 30 has a first electrode as an anode and a second electrode as a cathode.

Figure 5:
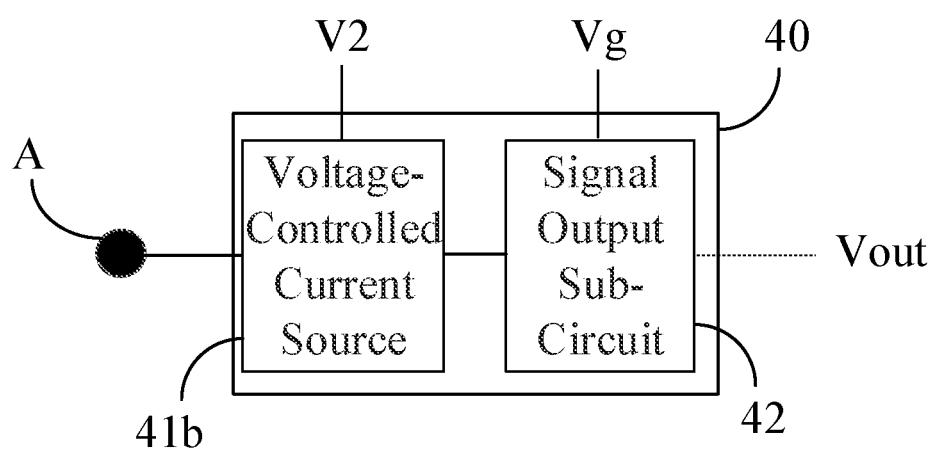
FIG. 5 is a partially schematic diagram of a light detection circuit according to an embodiment of the present disclosure.

FIG. 5 is a partially schematic diagram of a light detection circuit according to an embodiment of the present disclosure. As shown in FIG. 5, in the light detection circuit, the amplification sub-circuit 41 includes a voltage-controlled current source 41*b*. A power terminal of the voltage-controlled current source 41*b* is connected to the second power terminal V2; a control terminal of the voltage-controlled current source 41*b* is connected to the reading node A; and an output terminal of the voltage-controlled current source 41*b* is connected to the signal output sub-circuit 42. With the voltage-controlled current source 41*h* as the amplification sub-circuit; an output current of the voltage-controlled current source 41*b* may be changed as the potential of the reading node A changes, thereby amplifying the electrical signal at the reading node A. Meanwhile; with the voltage-controlled current source 41*b* as the amplification sub-circuit, the bias constant current source may not need to be disposed, which is helpful to further simplify the structure of the circuit.

Due to a corresponding relationship between the output current of the voltage-controlled current source 41*b* and the potential of the control terminal of the voltage-controlled current source 41*b*, the potential of the control terminal of the voltage-controlled current source 41*b* may be obtained according to the output current after the output current of the voltage-controlled current source 41*b* is obtained. That is, the potential of the reading node A is read.

Figure 6:
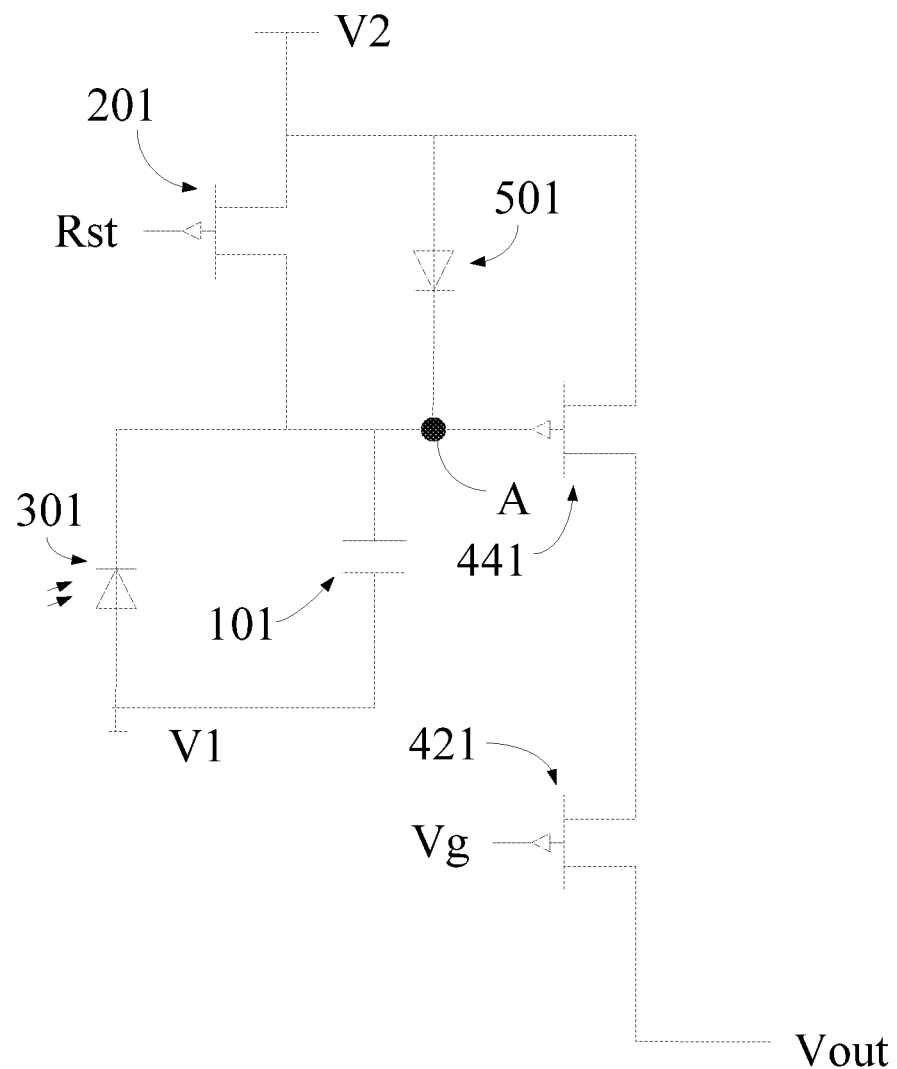
FIG. 6 is a circuit structure diagram of the light detection circuit shown in FIG. 5 according to an embodiment of the present disclosure.

FIG. 6 is a circuit structure diagram of the light detection circuit shown in FIG. 5 according to an embodiment of the present disclosure. As shown in FIG. 6, the voltage-controlled current source 41b may include a third TFT 441. A first electrode of the third TFT 441 is connected to the second power terminal V2; a control electrode of the third TFT 441 is connected to the reading node A; and the second electrode of the third TFT 441 is connected to an input terminal of the signal output sub-circuit 42. The signal output sub-circuit 42 may include a first TFT 421. A first electrode of the first TFT 421 is connected to a second electrode of the third TFT 441; a control electrode of the first TFT 421 is connected to a scanning signal input terminal Vg and is configured to receive a scanning signal; and a second electrode of the first TFT 421 is configured to output the detected electrical signal. For example, the first electrode of the third TFT 441 is a source electrode; the control electrode of the third TFT 441 is a gate electrode; and the second electrode of the third TFT 441 is a drain electrode. The potential of the source electrode of the third TFT 441 is always equal to the potential of the second power terminal V2. A current of the drain electrode of the third TFT 441 is in direct proportion to a potential difference between the gate electrode and the source electrode of the third TFT 441, a potential of the source electrode of the third TFT 441 is always equal to the potential of the second power terminal V2, and thus, the potential of the reading node can be amplified through the third TFT 441. With the TFT as the voltage-controlled current source, the size of the light detection circuit is reduced favorably.

In another implementation of the present disclosure, the signal collection sub-circuit 40 may include only the first TFT 421. The first electrode of the first TFT 421 is connected to the reading node A; and the control electrode of the first TFT 421 is configured to receive the scanning signal. With one TFT as the signal collection sub-circuit 40, the structure of the circuit can be simplified, thereby further reducing the size of the light detection circuit and reducing the cost.

In the following, the technical solution in this embodiment will be further illustrated by taking optical touch as an example, by comparing a light detection circuit with a light detection circuit having no potential pull-up circuit.

Figure 7:
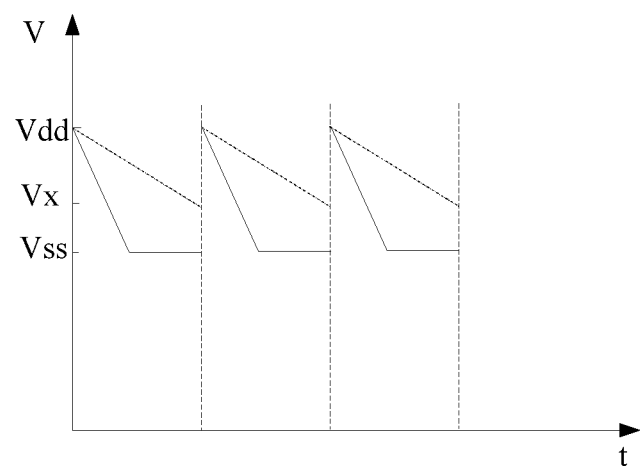
FIG. 7 is a schematic diagram of electrical signals detected by a light detection circuit having no potential pull-up sub-circuit.

FIG. 7 is a schematic diagram of electrical signals detected by a light detection circuit having no potential pull-up sub-circuit, showing the electrical signals of three detection periods. A dot-and-dash line indicates the changes of the electrical signals with weak ambient light, and a solid line indicates the changes of the electrical signals with strong ambient light.

As shown in FIG. 7, when the ambient light is weak, the potential of the reading node is Vdd after resetting, and the potential of the reading node Vdd is decreased to Vx in the detecting process. Since the decrease in the potential of the reading node of the light detection circuit corresponding to an region with a finger touch tends to be greater than the decrease in the potential of the reading node of the light detection circuit corresponding to an region without a finger touch, a decision on whether the region corresponding to the light detection circuit where the reading node is located is touched by a finger can be made based on a difference value between Vdd and Vx. When the ambient light is strong, the potential of the reading node is Vdd after resetting. In the detecting process, the light detection circuit in the region with the finger touch and the light detection circuit in the region without a finger touch are both subject to the strong ambient light, which may decrease the potential of the reading node to Vss in a duration less than one detection period. If both the potential of the reading node of the light detection circuit corresponding to the region with the finger touch and the potential of the reading node of the light detection circuit corresponding to the region without a finger touch are decreased to Vss, the region with the finger touch and the region without the finger touch cannot be distinguished.

As to the light detection circuit having the potential pull-up sub-circuit according to the embodiment of the present disclosure, the potential of the reading node is not decreased by the preset value within one detection period with weak ambient light, and the potential pull-up sub-circuit does not work. Here, the working process of the light detection circuit according to the embodiment of the present disclosure is the same as that of the light detection circuit having no potential pull-up sub-circuit, which will not be repeated here. The following only describes the working process of the light detection circuit according to the embodiment of the present disclosure, with strong ambient light.

Figure 8:
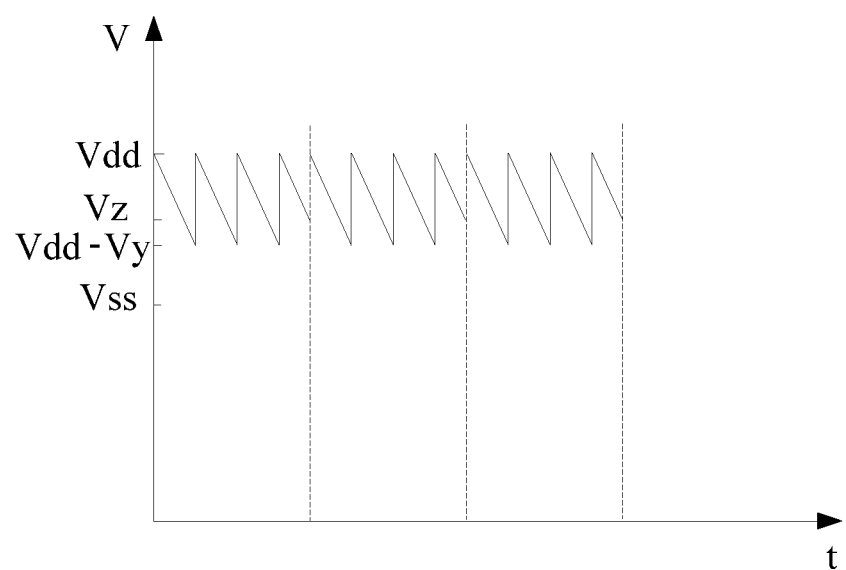
FIG. 8 is a schematic diagram of electrical signals detected by a light detection circuit according to an embodiment of the present disclosure.

FIG. 8 is a schematic diagram of electrical signals detected by a light detection circuit according to an embodiment of the present disclosure. As shown in FIG. 8, with strong ambient light, the potential of the reading node is Vdd after resetting. In the detecting process, the potential of the reading node is decreased due to the strong ambient light. When the potential of the reading node is decreased by the preset value, the second power terminal changes the potential of the reading node to the initial potential through the potential pull-up sub-circuit, so that the potential of the reading node may be decreased again. The potential of the reading node may be changed to the initial potential several times in one detection period. With different intensity of the ambient light, the number of times the potential of the reading node is reset to the initial potential may be different. The total potential changes may be calculated according to the following equation (1):

$$\Delta U = n*D + B - E \qquad (1)$$

Wherein, $\Delta U$ is the total potential changes; D is the preset value; B is the initial potential; E is a value to which the potential of the reading node is decreased after the last change of the potential of the reading node; and n is the number of times the potential of the reading node is reset to the initial potential. Since a sampling period of the output signal of the light detection circuit is much shorter than the detection period, the number of times the potential of the reading node is reset to the initial potential may be determined according to a plurality of sampled values sampled within the detection period. For example, a waveform may be fitted based on the sampled values, and the number of peaks in the obtained waveform may be determined as n.

For example, as shown in FIG. 8, the preset value D in a certain light detection circuit is Vy, and the initial potential B is Vdd. When the potential of the reading node is decreased from Vdd to Vdd-Vy, the potential of the reading node returns to Vdd under the action of the potential pull-up sub-circuit. In one detection period, the number of times the potential of the reading node is reset to Vdd is three, and the potential of the reading node is decreased to Vz after the last change of the potential of the reading node. Accordingly, it may be obtained that the total potential changes of the reading node are 3Vy+Vdd−Vz in one detection period. Since the total potential changes of the reading node in the region with the finger touch is different from that in the region without the finger touch, the region with the finger touch can be distinguished from the region without the finger touch.

In one detection period, since the potential of the reading node cannot be decreased to a value equal to the potential of the first power terminal, the light detection circuit may continuously perform exposure integration, i.e., the photo-electric diode may continuously generate a light current without reaching saturation, and the potential of the reading node may be continuously decreased, so that a relatively large total potential changes may be obtained to distinguish the region with the finger touch from the region without the finger touch.

Figure 9:
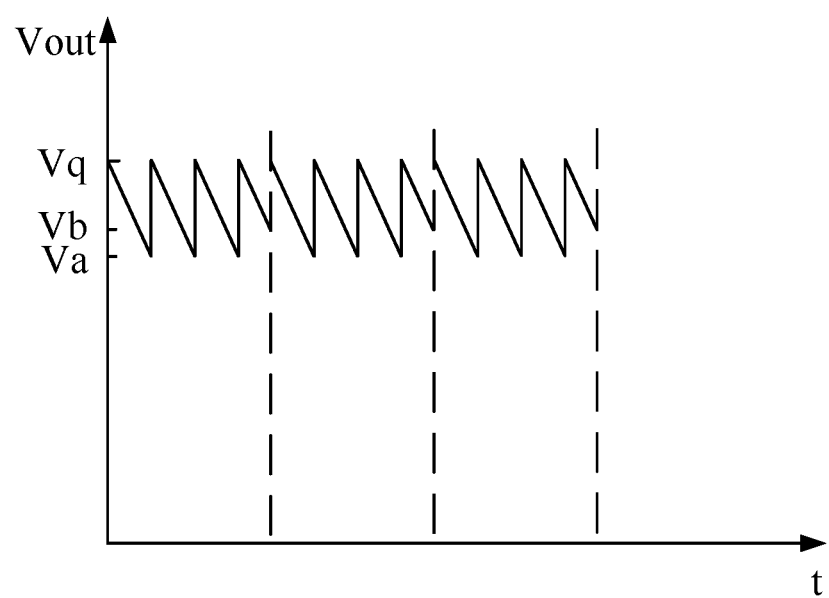
FIG. 9 is a schematic diagram of output signals of a light detection circuit according to an embodiment of the present disclosure.

FIG. 9 is a schematic diagram of output signals of a light detection circuit according to an embodiment of the present disclosure. As shown in FIG. 9, the potential corresponding to the output signal Vout of an output processing circuit of the light detection circuit is in direct proportion to the potential of the reading node, the change in the output signal Vout may reflect the change in the potential of the reading node, and thus, the region with the finger touch can be distinguished from the region without the finger touch according to the output signal Vout. Wherein Vq is the potential of the output signal when the potential of the reading node is Vdd; Va is the potential of the output signal when the potential of the reading node is Vdd-Vy, and Vb is the potential of the output signal when the potential of the reading node is Vz.

Optionally, after the total potential changes of the reading node is obtained, the quantity of charges discharged by the charge storage sub-circuit in the light detection circuit in the detection period can be obtained according to the total potential changes of the reading node, thereby distinguishing the region with the finger touch from the region without the finger touch. The quantity of the charges discharged by the charge storage sub-circuit within one detection period may be calculated according to the equation (2):

$$Q=\Delta U*C \quad (2)$$

Wherein, Q is the quantity of charges discharged by the charge storage sub-circuit in one detection period; $\Delta U$ is the total potential changes; and C is the capacitance of the charge storage sub-circuit. The region with the finger touch may be more significantly distinguished from the region without the finger touch by means of a difference value between the quantities of charges.

An embodiment of the present disclosure further provides an electronic device, which includes any one of the light detection circuits shown in FIGS. 1 to 6. The electronic device may be a mobile phone, a tablet computer, a display, a navigator, a clock-in machine, or other apparatuses having a light detection circuit. The light detection circuit may be either of an optical touch circuit and an optical fingerprint recognition circuit.

Figure 10:
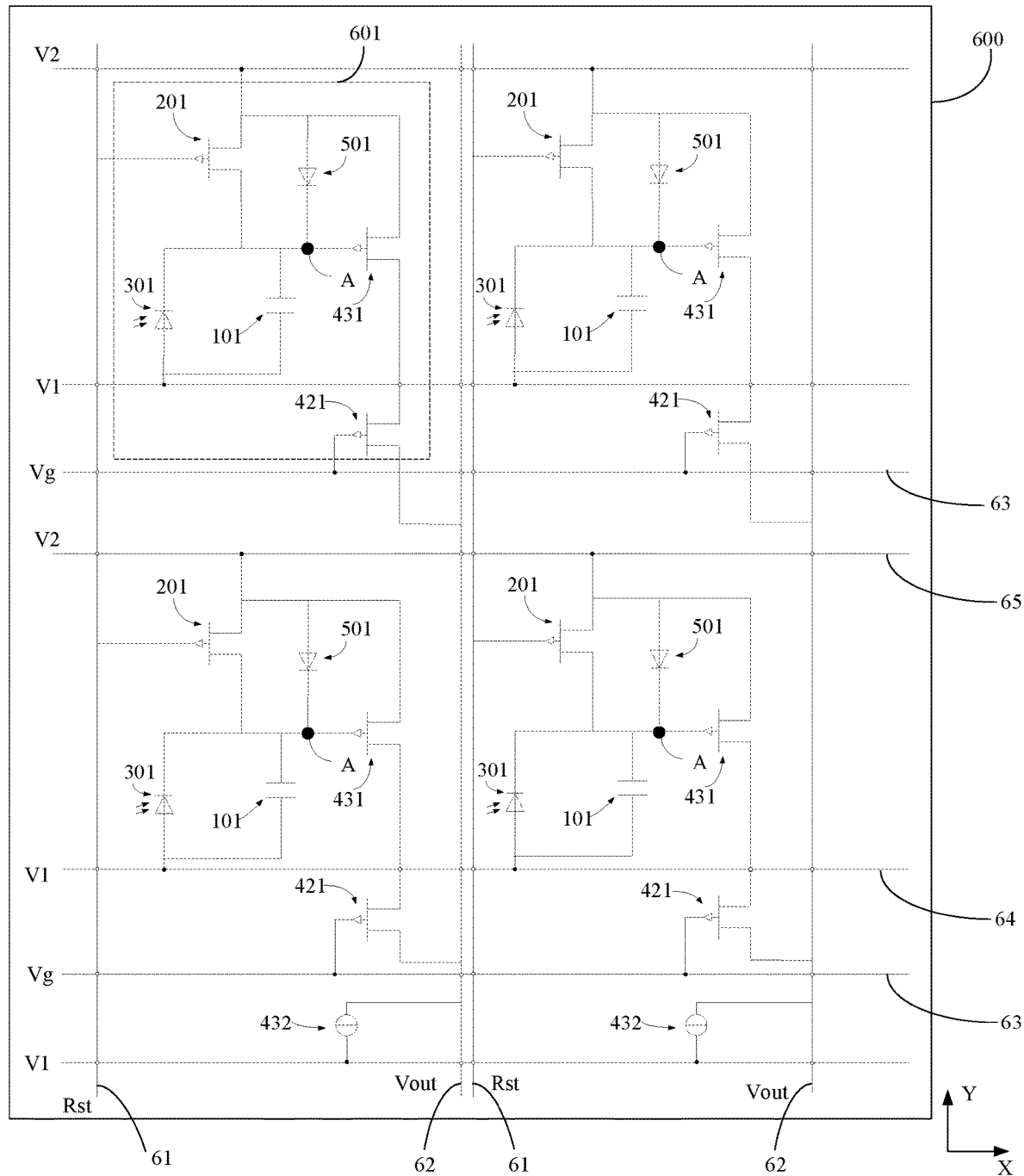
FIG. 10 is a partially schematic structural diagram of an electronic device according to an embodiment of the present disclosure.

FIG. 10 is a partially schematic structural diagram of an electronic device according to an embodiment of the present disclosure. As shown in FIG. 10, the electronic device may include a substrate 600 and a plurality of light detection circuits 601 distributed in a matrix distribution on the substrate 600. The substrate 600 is provided with a plurality of resetting lines 61, a plurality of scanning lines 63, and a plurality of reading lines 62. The plurality of scanning lines 63 are arranged in parallel at interval along a first direction (such as the direction Y in FIG. 10), and each scanning line 63 extends in a second direction (such as the direction X in FIG. 10).

Each of the respective scanning lines 63 is connected to the signal collection sub-circuits of a plurality of light detection circuits 601 arranged along a second direction. For example, the plurality of the scanning lines 63 are connected to the scanning signal input terminals of the light detection circuits 601. The plurality of resetting lines 61 and the plurality of reading lines 62 are arranged alternately in parallel at interval along the second direction, and each of the resetting lines 61 is connected to the resetting sub-circuits of a plurality of light detection circuits 601 arranged along the first direction, where the first direction and the second direction are is perpendicular to each other. Each of the reading lines 62 is connected to the signal collection sub-circuits of the plurality of light detection circuits 601 arranged along the first direction. The plurality of light detection circuits 601 arranged in an array are controlled by the resetting lines 61, the scanning lines 63, and the reading lines 62 provided, thereby facilitating the electronic device in recognizing the fingerprint or the touch region.

In addition, the substrate 600 may further be provided with first power lines 64 and second power lines 65. The first power lines 64 are connected to the first power terminal V1, and the second power lines 65 are connected to the second power terminal V2.

Figure 11:
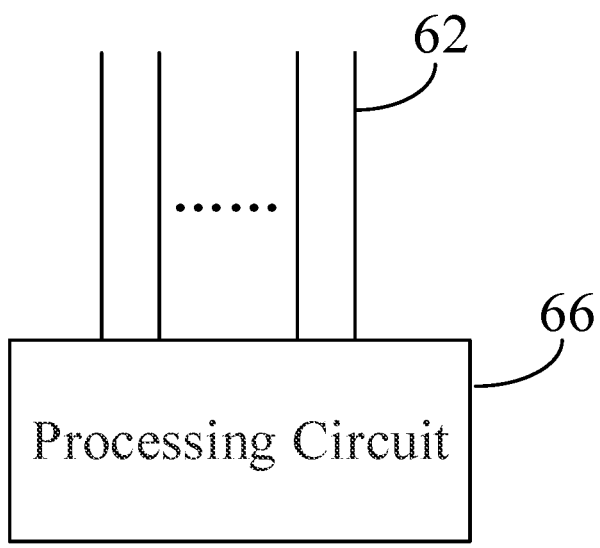
FIG. 11 is a partially schematic structural diagram of an electronic device according to an embodiment of the present disclosure.

FIG. 11 is a partially schematic structural diagram of an electronic device according to an embodiment of the present disclosure. As shown in FIG. 11, the electronic device may further include a processing circuit 66. The processing circuit 66 is connected to the reading lines 62, and is configured to obtain a quantity of charges discharged by the charge storage sub-circuits 10 in the light detection circuits 601 in a detection period according to the electrical signals, which are acquired on the reading lines 62, of the reading nodes A of the plurality of the light detection circuits 601. The quantity of charges is the accumulation of currents in time, which may accurately reflect the change in the potential of the reading node A throughout the process of acquiring the electrical signals, thereby accurately distinguishing ridges and valleys in the fingerprint or the touch regions and non-touch regions. The detection period may be obtained according to the frequency of the scanning signal.

Alternatively, the processing circuit 66 may be an IC (Integrated Circuit). The small-size IC is favorable to reducing the size of the electronic device.

The processing circuit 66 may be configured to distinguish between ridges and valleys in a fingerprint or to distinguish between touch regions and non-touch region, according to a difference value between the quantity of charges and a reference quantity of charges. Since the ambient light may increase the quantity of charges passing through the reading node A, the interference from the ambient light may be reduced by subtracting the reference quantity of charges, allowing a distinguishing result, to get more accurate.

Optionally, the reference quantity of charges is a minimum value among the quantities of charges discharged by the charge storage sub-circuits in the plurality of the light detection circuits. By subtracting the minimum value from each of quantities of charges corresponding to each of the light detection circuit, it may achieve the effect of ambient light in the current environment may be completely eliminated.

Taking an optical touch display apparatus with 5*5 light detection circuits as an example, 25 pieces of data are acquired in total after completing the scanning of all the light detection circuits, and the 25 pieces of data correspond to the quantities of charges discharged by the charge storage sub-circuits in the 5*5 light detection circuits. When the 25 pieces of data are processed, the minimum value among the 25 pieces of data may be subtracted from the 25 pieces of data, so that the impact of the ambient light irradiating the light detection circuits on the quantity of charges may be eliminated. In the optical touch display apparatus, when a finger touches the display apparatus, light emitted from the display apparatus is reflected on the finger and irradiates the photoelectric diodes. Meanwhile, ambient light also irradiates the photoelectric diodes in the regions with the finger touch. The light reflected by the finger and the ambient light work together to generate light currents in the photoelectric diodes. In the regions without the finger touch, only the ambient light irradiates the photoelectric diodes. When the minimum value among the 25 pieces of data is subtracted from the 25 pieces of data, the data corresponding to the non-touch regions is close to 0, and the data corresponding to the touch regions is greatly different from 0, so that the touch regions and the non-touch regions may be distinguished more easily.

Taking an optical fingerprint recognition apparatus with 4*4 light detection circuits as an example, 16 pieces of data are acquired in total after completing the scanning of all the light detection circuits, and the 16 pieces of data correspond to the quantities of charges discharged by the charge storage sub-circuits in the 4*4 light detection circuits. When the 16 pieces of data are processed, the minimum value among the 16 pieces of data may be likewise subtracted from the 16 pieces of data, so that the impact of the ambient light irradiating the light detection circuits on the quantity of charges may be eliminated. In the optical touch display apparatus, light emitted from a light source in the apparatus is reflected on the finger and irradiates the photoelectric diodes in the detecting process. Meanwhile, ambient light also irradiates the photoelectric diodes. The light reflected by the finger and the ambient light work together to generate light currents in the photoelectric diodes. Since the reflection of light by ridge lines on the finger is stronger than the reflection of light by valley lines, the light currents generated by the photoelectric diodes receiving the light reflected by the ridge lines are stronger than the light currents generated by the photoelectric diodes receiving the light reflected by the valley lines. The minimum value among the 16 pieces of data corresponds to the valley line. When the minimum value among the 16 pieces of data is subtracted from the 16 pieces of data, the data corresponding to the valley lines is close to 0, and the data corresponding to the ridge lines is greatly different from 0. In this way, the ridge lines and the valley lines may be distinguished more easily.

Optionally, the reference quantity of charges may also be the obtained quantity of charges corresponding to the current ambient light. As an example, the electronic device may further include an ambient light detection module, which is configured to detect the current ambient light to determine a reference quantity of charges corresponding to the current ambient light. The ambient light detection module may include a light detection circuit only for detecting the ambient light. The structure of the light detection circuit may be the same as the structure of the light detection circuit described above, and the reference quantity of charges may be obtained according to the output signal of the light detection circuit under the action of the ambient light.

The potential pull-up sub-circuit changes the potential of the reading node to the initial potential when the potential of the reading node is decreased by the preset value in the detecting process. The photoelectric diode may continuously generate a light current under the action of light, so that the potential of the reading node may be decreased again. The signal collection sub-circuit may continuously acquire the electrical signals of the reading node, thereby obtaining total potential changes of the reading node throughout the acquisition of the electrical signals, according to the preset value, the number times the potential of the reading node is changed to the initial potential, and a value to which the potential of the reading node is decreased after the last change. Accordingly, even when the intensity of ambient light is high, a touch can be accurately recognized in an optical touch recognition circuit, and ridge and valley lines can be accurately recognized in an optical fingerprint recognition circuit.

An embodiment of the present disclosure further provides a drive method for a light detection circuit. The method includes: inputting a scanning signal to the scanning signal input terminal, enabling the signal collection sub-circuit to acquire and output the electrical signals of the reading node; and pulling up, when the signal collection sub-circuit is acquiring the electrical signals of the reading node, the potential of the reading node to the initial potential when the potential of the reading node is decreased by the preset value.

Figure 12:
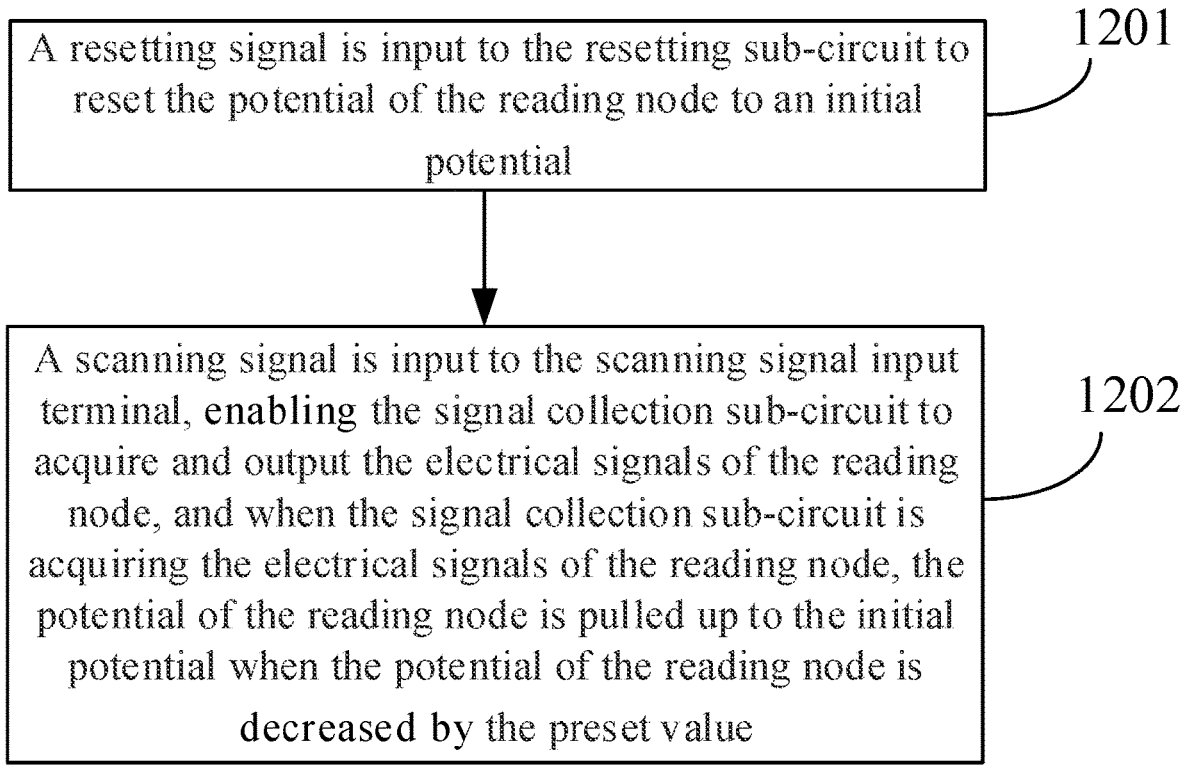
FIG. 12 is a flowchart of a drive method for a light detection circuit according to an embodiment of the present disclosure.

FIG. 12 is a flowchart of a drive method for a light detection circuit according to an embodiment of the present disclosure. This method may be applied to the light detection circuits shown in FIGS. 1 to 6 and the light detection circuit in the electronic device shown in FIG. 10. As shown in FIG. 12, the method includes:

In step 1201, a resetting signal is input to the resetting sub-circuit to reset the potential of the reading node to an initial potential.

In step 1202, a scanning signal is input to the scanning signal input terminal, enabling the signal collection sub-circuit to acquire and output the electrical signals of the reading node, and when the signal collection sub-circuit is acquiring the electrical signals of the reading node, the potential of the reading node is pulled up to the initial potential when the potential of the reading node is decreased by the preset value.

The potential pull-up sub-circuit changes the potential of the reading node to the initial potential when the potential of the reading node is decreased by the preset value in the detecting process of the light detection circuit. The photoelectric diode may continuously generate a light current under the action of light, so that the potential of the reading node may be decreased again. The signal collection sub-circuit may continuously acquire the electrical signals of the reading node, thereby obtaining total potential changes of the reading node throughout the acquisition of the electrical signals, according to the preset value, the number of times the potential of the reading node is changed to the initial potential, and a value to which the potential of the reading node is decreased after the last change. Accordingly, even when the intensity of ambient light is high, a touch can be accurately recognized in an optical touch recognition circuit, and ridge and valley lines can be accurately recognized in an optical fingerprint recognition circuit.

This embodiment illustrates the method in detail by taking the electronic device having the structure shown in FIG. 10 as an example. For convenience of illustration, the electronic device only includes three scanning lines 63, for example.

Figure 13:
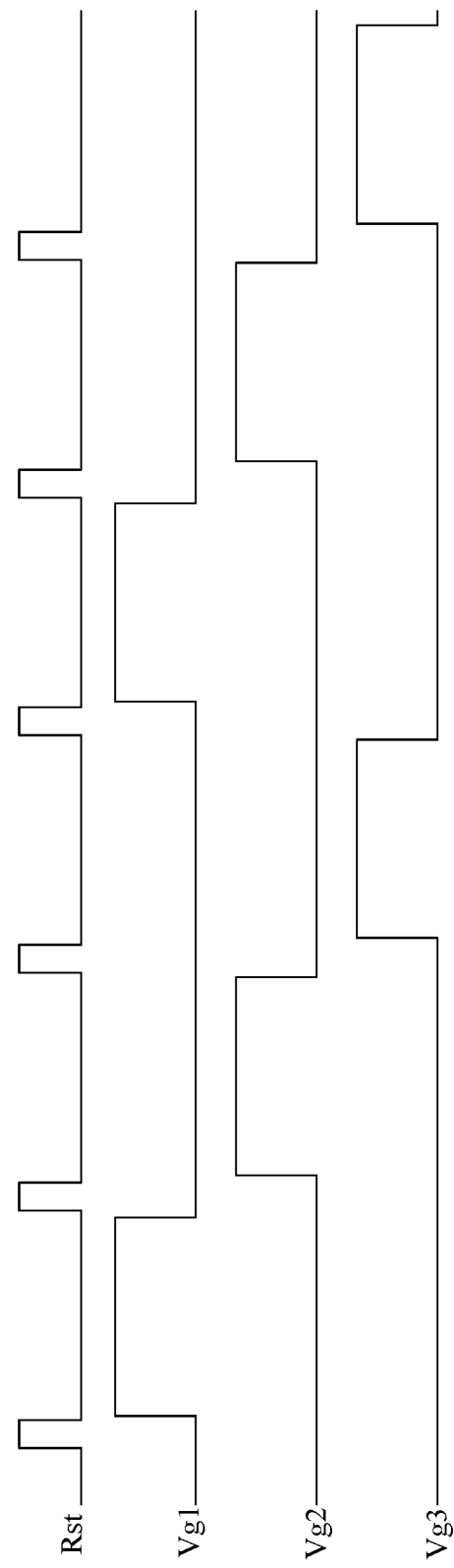
FIG. 13 is a diagram showing a control timing of an electronic device according to an embodiment of the present disclosure.

FIG. 13 is a diagram showing a control timing of an electronic device according to an embodiment of the present disclosure. As shown in FIG. 13, resetting signals list are loaded on the resetting lines 61, and scanning signals are loaded on the scanning lines 63 (with Vg1, Vg2 and Vg3 representing the scanning signals loaded on the three scanning lines 63, respectively). When the resetting signals Rst are at a high level, the potential of the reading nodes of the light detection circuits in the electronic device is reset to the initial potential. When the scanning signals are at a high level, for example, when Vg1 is at a high level, the signal collection sub-circuits of the light detection circuits connected to the scanning line 63 corresponding to Vg1 outputs the acquired electrical signals to the reading lines 62, and the processing circuit connected to the reading lines 62 may receive the electrical signals of the light detection circuits. When Vg1 changes from a high level to a low level, the signal collection sub-circuits stop outputting the electrical signals to the reading lines 62. At the beginning of an acquisition, the resetting sub-circuits reset the potentials of the reading nodes to the initial potential under the action of the resetting signals Rst. After the resetting, the resetting sub-circuit is turned off, and the signal collection sub-circuits start to continuously acquire the electrical signals of the reading node under the action of the scanning signals, until the end of one scanning period. The electrical signals acquired by the signal collection sub-circuits may be output to the foregoing processing circuits. Wherein, the direction along the direction X in FIG. 10 is taken as a row direction in which the light detection circuits are arranged. The light detection circuits are controlled to perform detection row by row, thereby completing the detection of all the light detection circuits.

Figure 14:
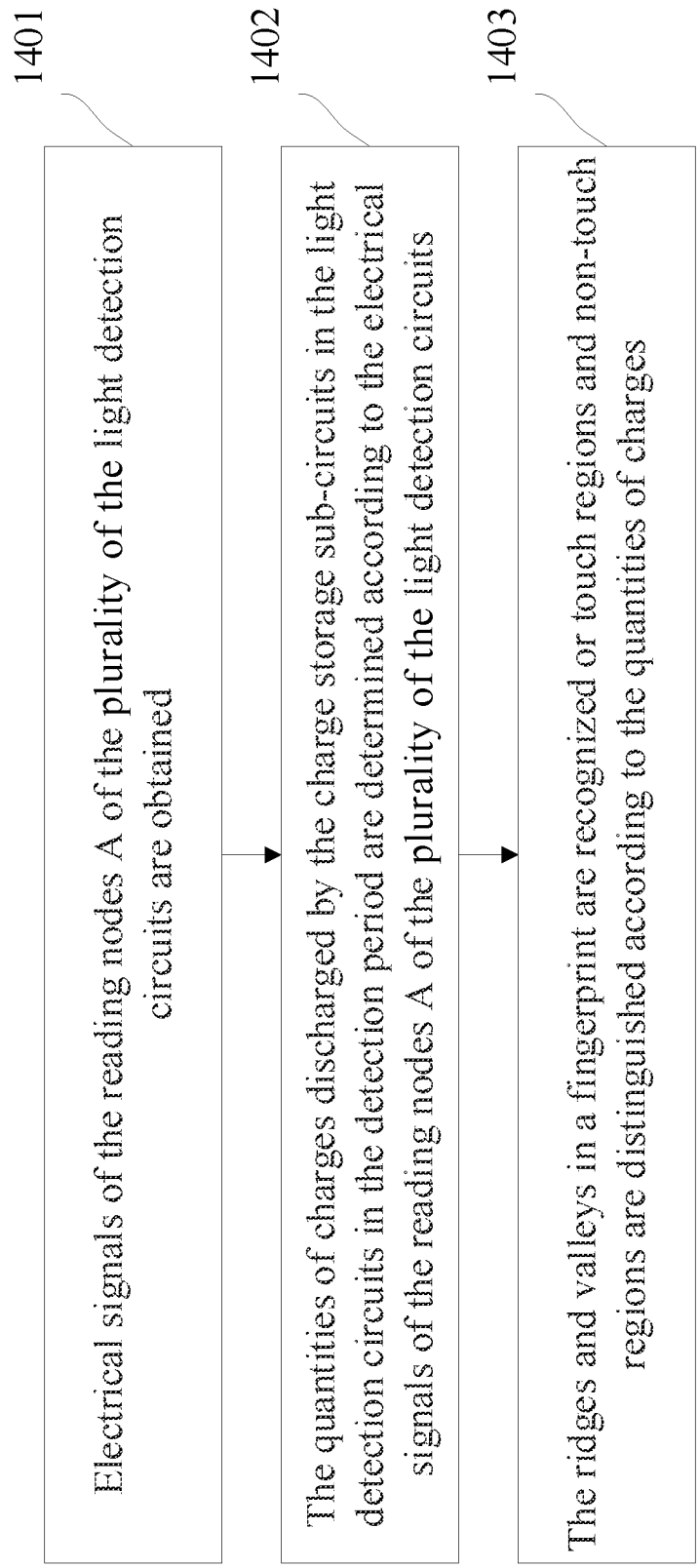
FIG. 14 is a flowchart of an optical recognition method shown according to an exemplary embodiment.

FIG. 14 is a flowchart of an optical recognition method shown according to an exemplary embodiment, which is suitable for the electronic device above. Referring to FIG. 14, the method includes the following steps.

In step 1401, electrical signals of the reading nodes A of the plurality of the light detection circuits are obtained.

In step 1402, the quantities of charges discharged by the charge storage sub-circuits in the light detection circuits in the detection period are determined according to the electrical signals of the reading nodes A of the plurality of the light detection circuits.

As an example, step 1402 may include: determining quantities of charges discharged by the charge storage sub-circuits in the light detection circuits in the detection period based on the preset value, the initial potential, a value to which the potential of the reading nodes is decreased finally in the detection period, and a number of times the potential of the reading node is reset to the initial potential in the detection period.

Here, for the method of determining the quantities of charges discharged by the charge storage sub-circuits in the light detection circuits during the detection period, a reference may be made to relevant description of the foregoing equations (1) and (2), and the detailed description is omitted here.

In step 1403, the ridges and valleys in a fingerprint are recognized or touch regions and non-touch regions are distinguished according to the quantities of charges.

For the implementation of the step 1403, a reference may be made to relevant description of FIG. 11, and the detailed description is omitted here.

Figure 15:
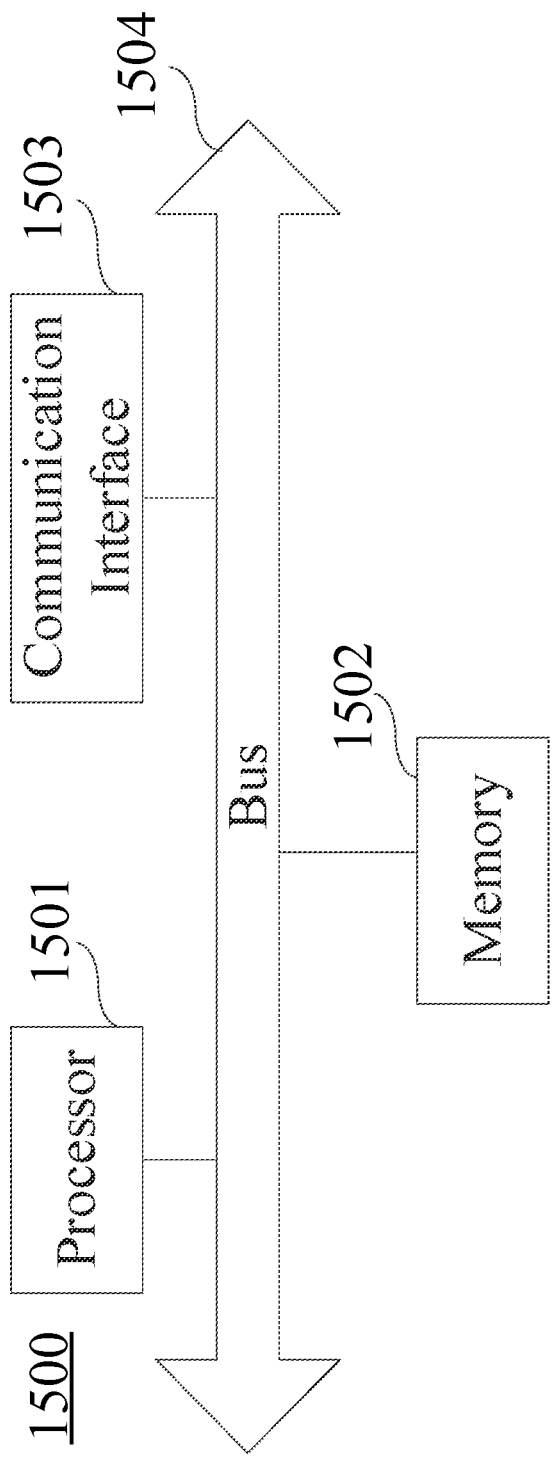
FIG. 15 is a block diagram of an optical recognition apparatus shown according to an exemplary embodiment.

FIG. 15 is a block diagram of an optical recognition apparatus shown according to an exemplary embodiment. The optical recognition device 1500 includes a processor 1501, a memory 1502, a communication interface 1503 and bus 1504.

The processor 1501 includes one or more processing cores. The processor 1501 executes various function applications and information processing by running software programs and modules.

The communication interface 1503 may be realized as a communication component which may be a communication chip.

The memory 1502 is connected with the processor 1501 via the bus 1504.

The memory 1502 is configured to store at least one instruction. The processor 1501 is configured to execute the at least one instruction to realize the steps of the above method embodiments.

In addition, the memory 1502 may be implemented by any type of volatile or non-volatile storage devices or combinations thereof, such as a magnetic or optical disk, an electrically erasable programmable read-only memory (EEPROM), an erasable programmable read-only memory (EPROM), a static anytime access memory (SRAM), a read-only memory (ROM), a magnetic memory, a flash memory, or a programmable read-only memory (PROM).

An embodiment of the present disclosure further provides a computer-readable storage medium. At least one instruction, at least one program, a code set or an instruction set is stored in the storage medium and may be loaded and executed by the processor to implement the optical recognition method according to the above method embodiments of the present disclosure.

The foregoing descriptions are merely optional embodiments of the present disclosure, and are not intended to limit the present disclosure. Within the spirit and principles of the disclosure, any modifications, equivalent substitutions, improvements, etc., are within the protection scope of the present disclosure.

What is claimed is:

1. A light detection circuit, comprising:
    a charge storage sub-circuit, which is connected between a reading node and a first power terminal;
    a photoelectric conversion sub-circuit, which has one end connected to the reading node, and the other end connected to the first power terminal;
    a signal collection sub-circuit, which is connected to a scanning signal input terminal and the reading node, respectively, and is configured to acquire and output an electrical signal of the reading node under control of a scanning signal received by the scanning signal input terminal; and
    a potential pull-up sub-circuit, which is connected to the reading node and a second power terminal, respectively, and is configured to connect the charge storage sub-circuit with the second power terminal when a potential of the reading node is decreased by a preset value, thereby pulling up the potential of the reading node to an initial potential.

2. The light detection circuit according to claim 1, wherein the potential pull-up sub-circuit comprises a diode, a first electrode of the diode is connected to the reading node, and a second electrode of the diode is connected to the second power terminal.

3. The light detection circuit according to claim 2, wherein the first power terminal is configured to provide a first power signal, the second power terminal is configured to provide a second power signal, and a potential of the first power signal is lower than a potential of the second power signal; and
    the first electrode of the diode is a cathode, and the second electrode of the diode is an anode.

4. The light detection circuit according to claim 1, wherein the signal collection sub-circuit comprises a first thin film transistor, a first electrode of the first thin film transistor is connected to the reading node, a control electrode of the first thin film transistor is connected to a scanning signal input terminal, and a second electrode of the first thin film transistor is configured to output the electrical signal of the reading node.

5. The light detection circuit according to claim 1, wherein the signal collection sub-circuit comprises an amplification sub-circuit and a signal output sub-circuit,
the amplification sub-circuit is connected to the reading node and the second power terminal, and is configured to amplify the electrical signal of the reading node and output the amplified electrical signal to the signal output sub-circuit; and
the signal output sub-circuit is connected to the amplification sub-circuit and the scanning signal input terminal, respectively, and is configured to output the amplified electrical signal, which is received by the signal output sub-circuit, under control of the scanning signal received by the scanning signal input terminal.

6. The light detection circuit according to claim 5, wherein the amplification sub-circuit comprises a voltage follower, a power terminal of the voltage follower is connected to the second power terminal, an input terminal of the voltage follower is connected to the reading node, and an output terminal of the voltage follower is connected to an input terminal of the signal output sub-circuit.

7. The light detection circuit according to claim 6, wherein the voltage follower comprises a second thin film transistor, a first electrode of the second thin film transistor is connected to the second power terminal, a control electrode of the second thin film transistor is connected to the reading node, a second electrode of the second thin film transistor is connected to the input terminal of the signal output sub-circuit, and the amplification sub-circuit further comprises a bias constant current source, which is connected between an output terminal of the signal output sub-circuit and the first power terminal.

8. The light detection circuit according to claim 7, wherein the signal output sub-circuit comprises a first thin film transistor, a first electrode of the first thin film transistor is connected to the second electrode of the second thin film; a control electrode of the first thin film transistor is connected to the scanning signal input terminal, a second electrode of the first thin film transistor is configured to output the amplified electrical signal and the bias constant current source is connected between a second electrode of the first thin film transistor and the first power terminal.

9. The light detection circuit according to claim 5, wherein the amplification sub-circuit comprises a voltage-controlled current source, a power terminal of the voltage-controlled current source is connected to the second power terminal, a control terminal of the voltage-controlled current source is connected to the reading node, and an output terminal of the voltage-controlled current source is connected to an input terminal of the signal output sub-circuit.

10. The light detection circuit according to claim 9, wherein the voltage-controlled current source comprises a third thin film transistor, a first electrode of the third thin film transistor is connected to the second power terminal, a control electrode of the third thin film transistor is connected to the reading node, and a second electrode of the third thin film transistor is connected to the input terminal of the signal output sub-circuit.

11. The light detection circuit according to claim 10, wherein the signal output sub-circuit comprises a first thin film transistor, a first electrode of the first thin film transistor is connected to the second electrode of the third thin film transistor, a control electrode of the first thin film transistor is connected to the scanning signal input terminal, and a second electrode of the first thin film transistor is configured to output an amplified electrical signal.

12. The light detection circuit according to claim 1, further comprising:
a resetting sub-circuit, which is connected to a resetting signal input terminal, the reading node and the second power terminal, respectively, and is configured to reset the potential of the reading node to the initial potential under control of a resetting signal received by the resetting signal input terminal.

13. The light detection circuit according to claim 12, wherein the resetting sub-circuit comprises a fourth thin film transistor, a first electrode of the fourth thin film transistor is connected to the second power terminal, a control electrode of the fourth thin film transistor is connected to the resetting signal input terminal, and a second electrode of the fourth thin film transistor is connected to the reading node.

14. The light detection circuit according to claim 1, further comprising a resetting sub-circuit, wherein the charge storage sub-circuit comprises a capacitor, the photoelectric conversion sub-circuit comprises a photoelectric diode, the resetting sub-circuit comprises a fourth thin-film transistor, the signal collection sub-circuit comprises a first thin-film transistor, a second thin-film transistor and a bias constant current source, and the potential pull-up circuit comprises a diode,
two polar plates of the capacitor are connected to the reading node and the first power terminal, respectively,
a first electrode of the diode is connected to the reading node, and a second electrode of the diode is connected to the second power terminal,
a first electrode of the fourth thin film transistor is connected to the second power terminal, and a second electrode of the fourth thin film transistor is connected to the reading node,
a first electrode of the photoelectric diode is connected to the reading node, and a second electrode of the photoelectric diode is connected to the first power terminal, and
a first electrode of the second thin film transistor is connected to the second power terminal, a control electrode of the second thin film transistor is connected to the reading node, a second electrode of the second thin film transistor is connected to a first electrode of the first thin film transistor, a control electrode of the first thin film transistor is connected to the scanning signal input terminal, and the bias constant current source is connected between a second electrode of the first thin film transistor and the first power terminal.

15. An electronic device, comprising a light detection circuit, wherein the light detection circuit comprises:
a charge storage sub-circuit, which is connected between a reading node and a first power terminal;
a photoelectric conversion sub-circuit, which has one end connected to the reading node, and the other end connected to the first power terminal;
a signal collection sub-circuit, which is connected to a scanning signal input terminal and the reading node, respectively, and is configured to acquire and output an electrical signal of the reading node under control of a scanning signal received by the scanning signal input terminal; and a potential pull-up sub-circuit, which is connected to the reading node and a second power terminal, respectively, and is configured to connect the charge storage sub-circuit with the second power terminal when a potential of the reading node is decreased by a preset value, thereby pulling up the potential of the reading node to an initial potential.

16. The electronic device according to claim 15, comprising a substrate and a plurality of the light detection circuits distributed according to a matrix distribution on the substrate, wherein the substrate is provided with a plurality of scanning lines and a plurality of reading lines, the plurality of scanning lines are arranged in parallel at interval along a first direction, each of the scanning lines is connected to the scanning signal input terminals of a plurality of the light detection circuits arranged along a second direction, the plurality of reading lines are arranged in parallel at interval along the second direction, and each of the reading lines is connected to output terminals of the signal collection sub-circuits of a plurality of the light detection circuits arranged along the first direction.

17. The electronic device according to claim 16, further comprising a processing circuit, wherein the processing circuit is connected to the reading lines, and is configured to obtain quantities of charges discharged by the charge storage sub-circuits in the light detection circuits in a detection period according to the electrical signals, which are output on the reading lines, of the reading nodes of the plurality of the light detection circuits.

18. The electronic device according to claim 17, wherein the processing circuit is further configured to perform at least one of the following procedures:

distinguishing between ridges and valleys in a fingerprint according to difference values between the quantities of charges and a reference quantity of charges; and distinguishing between touch regions and non-touch regions according to difference values between the quantities of charges and the reference quantity of charges;

wherein the reference quantity of charges is one of:

the minimum among the quantities of charges discharged by the charge storage sub-circuits in the plurality of the light detection circuits; and a quantity of charges, corresponding to ambient light, determined based on output signals which are detected by an ambient light detection circuit, wherein structure of the ambient light detection circuit is the same as structure of the light detection circuits.

19. An optical recognition method for an electronic device, wherein the electronic device comprises a plurality of the light detection circuits, and the light detection circuit comprises:

a charge storage sub-circuit, which is connected between a reading node and a first power terminal;

a photoelectric conversion sub-circuit, which has one end connected to the reading node, and the other end connected to the first power terminal;

a signal collection sub-circuit, which is connected to a scanning signal input terminal and the reading node, respectively, and is configured to acquire and output an electrical signal of the reading node under control of a scanning signal received by the scanning signal input terminal; and a potential pull-up sub-circuit, which is connected to the reading node and a second power terminal, respectively, and is configured to connect the charge storage sub-circuit with the second power terminal when a potential of the reading node is decreased by a preset value, thereby pulling up the potential of the reading node to an initial potential;

and the method comprises:

obtaining electrical signals of the reading nodes of the plurality of the light detection circuits;

determining quantities of charges discharged by the charge storage sub-circuits in the light detection circuits in the detection period according to the electrical signals of the reading nodes of the plurality of the light detection circuits; and recognizing the ridges and valleys in a fingerprint or distinguishing between touch regions and non-touch regions, according to the quantities of charges.

20. The method according to claim 19, wherein the determining quantities of charges discharged by the charge storage sub-circuits in the light detection circuits in the detection period according to the electrical signals of the reading nodes of the plurality of the light detection circuits comprises:

determining quantities of charges discharged by the charge storage sub-circuits in the light detection circuits in the detection period based on the preset value, the initial potential, a value to which the potential of the reading nodes is decreased at end of the detection period, and a number of times the potential of the reading node is reset to the initial potential in the detection period.

* * * * *